(12) United States Patent
Simmons

(10) Patent No.: US 7,654,038 B2
(45) Date of Patent: Feb. 2, 2010

(54) GARDEN PLANTER HAVING INTEGRATED IRRIGATION AND ILLUMINATION SYSTEMS

(75) Inventor: Gary D. Simmons, Hudsonville, MI (US)

(73) Assignee: Simmons Specialty Products LLC, Hudsonville, MI (US)

( * ) Notice: Subject to any disclaimer, the term of this patent is extended or adjusted under 35 U.S.C. 154(b) by 276 days.

(21) Appl. No.: 11/550,833

(22) Filed: Oct. 19, 2006

(65) Prior Publication Data

US 2007/0084114 A1    Apr. 19, 2007

Related U.S. Application Data

(60) Provisional application No. 60/728,063, filed on Oct. 19, 2005.

(51) Int. Cl.
| A47G 7/02 | (2006.01) |
| A01G 9/20 | (2006.01) |
| A01G 27/00 | (2006.01) |
| A01G 9/02 | (2006.01) |
| A01G 9/24 | (2006.01) |

(52) U.S. Cl. ............................ 47/66.6; 47/67; 47/79
(58) Field of Classification Search ............ 47/39, 47/48.5, 65, 65.5, 66.6, 67, 79, 82; 248/318
See application file for complete search history.

(56) References Cited

U.S. PATENT DOCUMENTS

| 1,063,395 | A | * | 6/1913 | Scribner ............................ 47/67 |
| D183,742 | S | * | 10/1958 | Howard ........................... D6/513 |
| 3,950,637 | A | * | 4/1976 | Rodin ............................. 362/154 |
| D240,262 | S | * | 6/1976 | Dalgaard-Hansen ........ D11/144 |
| 4,117,630 | A | * | 10/1978 | Kalas ................................ 47/67 |
| 4,152,629 | A | * | 5/1979 | Raupp .......................... 315/362 |
| 4,562,959 | A | * | 1/1986 | Pointer, Jr. ....................... 239/38 |
| 4,760,666 | A | * | 8/1988 | Han ................................ 47/79 |
| 4,825,591 | A | * | 5/1989 | Han ................................ 47/67 |
| 4,845,602 | A | * | 7/1989 | Lehocki ....................... 362/122 |
| 4,848,029 | A | * | 7/1989 | Han ................................ 47/79 |
| 5,430,972 | A | * | 7/1995 | Wianecki ..................... 47/66.6 |
| 5,454,187 | A | * | 10/1995 | Wasserman ..................... 47/39 |
| 5,675,931 | A | * | 10/1997 | Wasserman ..................... 47/39 |
| 5,806,239 | A | * | 9/1998 | Wesolowski .................... 47/39 |
| 5,836,109 | A | * | 11/1998 | Kunz et al. ...................... 47/67 |
| 5,848,494 | A | * | 12/1998 | Spelt .............................. 47/67 |
| 5,860,248 | A | * | 1/1999 | Peters ............................. 47/67 |
| 6,161,329 | A | * | 12/2000 | Spelt .............................. 47/67 |
| 6,250,770 | B1 | * | 6/2001 | Countryman et al. ........ 362/122 |
| 6,843,022 | B1 | * | 1/2005 | Holley ............................ 47/67 |
| 6,845,588 | B2 | * | 1/2005 | Muxlow ......................... 47/67 |

(Continued)

FOREIGN PATENT DOCUMENTS

JP         11037382 A  *  2/1999

*Primary Examiner*—Rob Swiatek
*Assistant Examiner*—Danielle Bates
(74) *Attorney, Agent, or Firm*—Price, Heneveld, Cooper, DeWitt & Litton, LLP

(57) ABSTRACT

A garden planter with integrated irrigation and lighting systems (100) includes a container (101) for holding plants and an irrigation tube (107) for supplying water to the interior of the container (101). A light (213) is positioned above the container (101) for providing illumination. One or more fastening tubes (105) are used for supporting the container (101) and supplying irrigation directly to the container or concealing the irrigating tube (107).

14 Claims, 7 Drawing Sheets

U.S. PATENT DOCUMENTS

| | | | |
|---|---|---|---|
| 6,869,198 B1* | 3/2005 | Garza | 362/123 |
| 2002/0189163 A1* | 12/2002 | Cooper | 47/39 |
| 2004/0045218 A1* | 3/2004 | Muxlow | 47/79 |
| 2005/0081441 A1* | 4/2005 | Mantovani | 47/67 |
| 2006/0112633 A1* | 6/2006 | Humphrey et al. | 47/66.6 |
| 2006/0273230 A1* | 12/2006 | Logan et al. | 248/318 |

* cited by examiner

GARDEN PLANTER HAVING INTEGRATED IRRIGATION AND ILLUMINATION SYSTEMS

CROSS-REFERENCE TO RELATED APPLICATION

This application claims the benefit of provisional patent application entitled "Garden Planter Having Integrated Irrigation and Illumination Systems" filed on Oct. 19, 2005, as Ser. No. 60/728,063.

FIELD OF THE INVENTION

The present invention relates generally to an irrigation planter and more particularly to a hanging planter having integrated irrigation and lighting systems.

BACKGROUND

Garden planters are well known and used to enhance the beauty of local surroundings by allowing plantings of all varieties to be used in any desired location. The typical garden planter includes a basket which is suspended from an overhead structure using rope, chain, wire, rods, tubing or other materials in a tripod configuration. The basket works to hold either soil or a flower pot along with its associated greenery. Another type of planter is the flower box-type planter which is a rigid structure configured in different shapes, that may be fixed or mobile and is not suspended.

A disadvantage in using these types of planters occurs when the plants and other greenery need to be watered. In hot and dry climates, plants must be watered frequently in order to keep them green and vibrant. In other instances the location of the planter makes it difficult to provide water to the plants. Thus, depending on the location of the planter, the frequency of watering and the number of planters involved, garden planters can require much effort just to keep the plants green and vibrant.

Another issue involving planters occurs when the user wishes to view the planter at night or in a darkened environment. In order to view the planter in darkness, most often the user must add a floodlight or some other form of task lighting that is projected up to the planter. This can be difficult, requiring the addition of lighting fixtures, wires and other electrical devices to locations that will enable the planter to be illuminated. Although light can be projected toward the planter, often the planter still is in partial darkness where it is difficult to see the plant color(s) even with this illumination. Thus, the need exists to provide a garden planter system that can be easily irrigated that removes the user's burden of continually watering the planter while also enabling the planter to be easily illuminated in a nighttime or dark environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
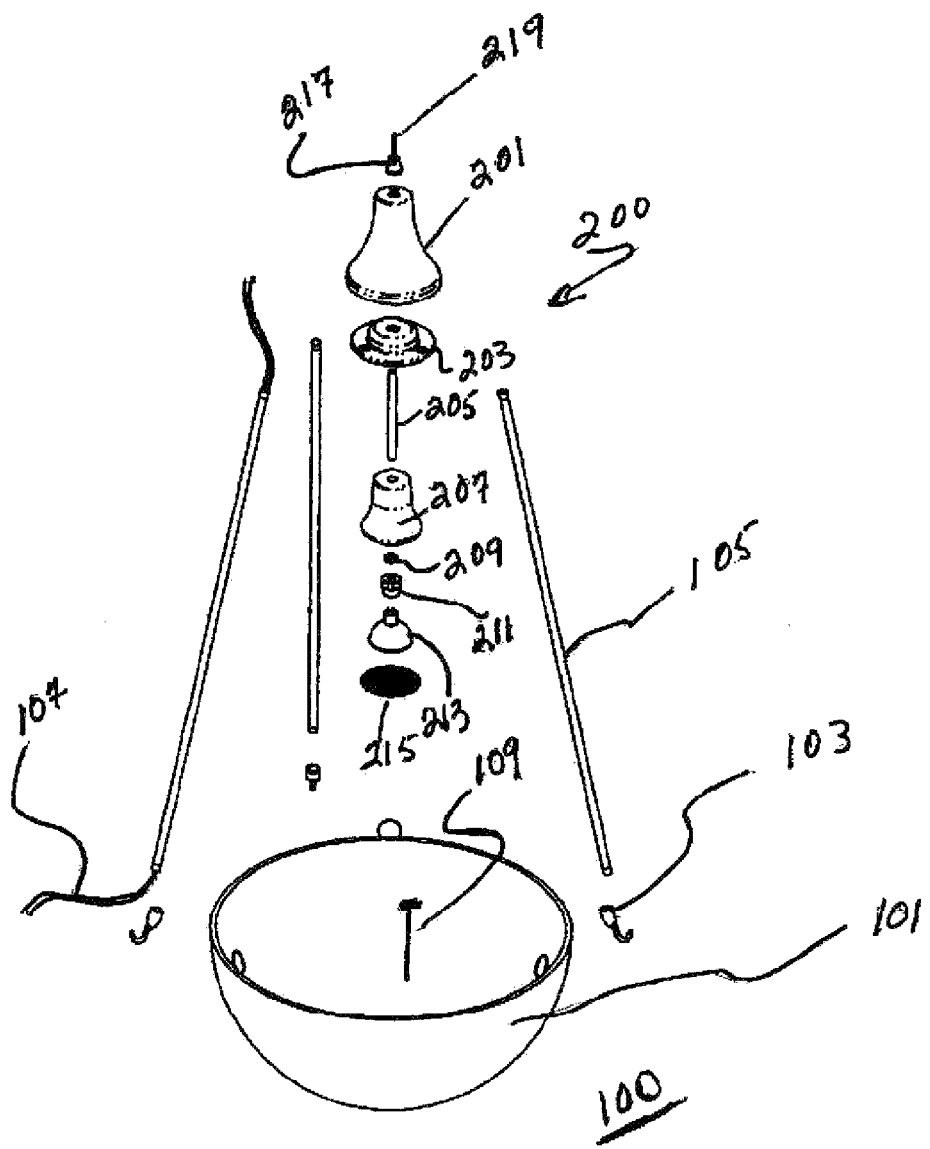
FIG. 1 is an exploded view of the garden planter with irrigation and lighting system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a garden planter with an integrated irrigation and lighting system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2A:
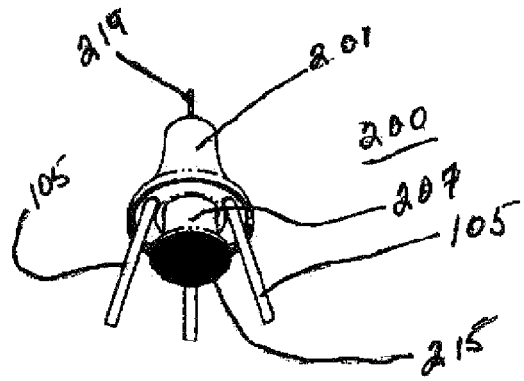
FIG. 2A is a side perspective view of the support assembly used to support the planter in accordance with an embodiment of the invention.

Referring now to FIG. 1, the garden planter system with integrated irrigation and illumination 100 includes a container or basket 101 for holding potting soil, a flower pot device or the like. The basket 101 is fastened at predetermined points about its perimeter using a plurality of link attachments 103 which use one or more fastening tubes 105 or the like. The fastening tube 105 is joined at an upper point where each of the tubes converge at a support assembly 200. As seen in FIG. 2A, the upper end of the fastening tube is flared in diameter so that when inserted into an aperture of the support assembly 200 it is frictionally engaged within the assembly enabling it to be held into a flexible position. The fastening tube 105 is connects to the basket 101 using a hook fastener or the like enabling easy detachment.

The garden planter further includes a predetermined length of water line tubing 107 that is inserted through at least one of the fastening tubes 105. The water line tubing 107 extends into the basket 101 at a point where the fastening tube 105 is joined with a link attachment 103. The tubing may be sized appropriately to provide the proper volume of water but the typical size is approximately one-quarter inch. The tubing is terminated using a drip watering device 109 at the inner portion of the basket 101 where water is provided at adjustable flow rates, including complete shut off. One example of a drip watering device 109 is that manufactured by Antelco Pty, Ltd. and is commonly called a "Shrubbler 360" that typically provides water at a slow and soaking flow rate directed in an even, circular pattern. At its opposite end, the water line tubing 107 is fed through the support assembly 200 as described herein where it can be connected to a water source such as a faucet or sprinkler head.

Figure 2B:
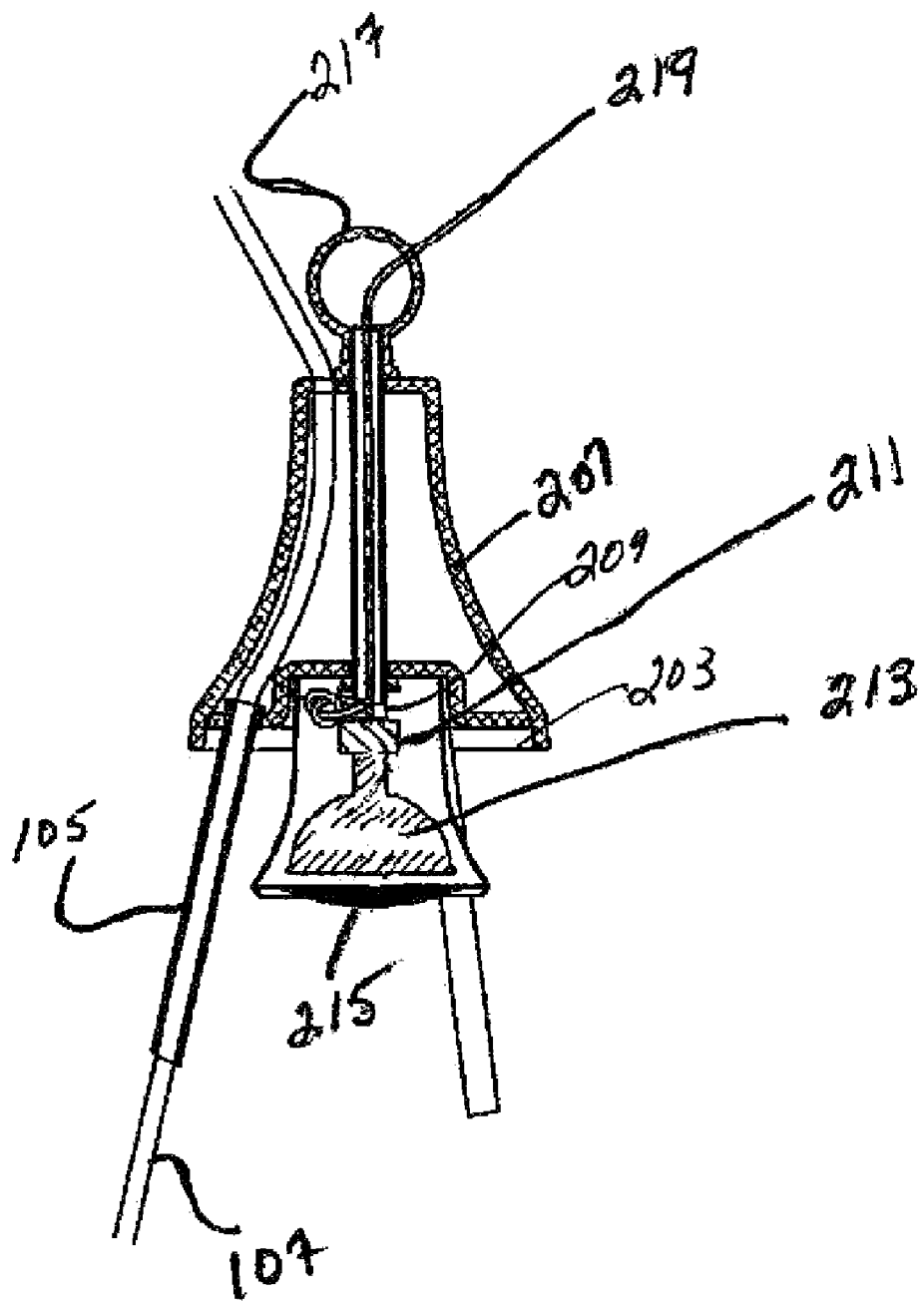
FIG. 2B is cross-sectional view of the support assembly as shown in FIG. 2A.

Each of FIGS. 1, 2A and 2B illustrate the support assembly 200 used for illuminating the interior of the basket 101. The support assembly 200 includes a bell-shaped shroud 201 that covers a circular support fixture 203. An electrical conduit 205 is used in connection with an electrical light socket 211 to supply electric power to a bulb 213, that are covered by a shade 207. Although any type light may be used, a low-voltage DC lamp may be preferred since a DC power source such as a wall supply transformer; battery or solar cell source is easily used without the dangers associated with 120-volt AC light sources. Moreover, it should be evident to those skilled in the art that any type of light may be used including standard lighting, light emitting diode (LED) lighting, a grow light or colored lighting. A washer and mechanical fastener 209 are used to secure the conduit to the light socket 211. A light bulb screen or lens guard 215 works to provide diffused or colored light to the interior of the basket 101 and prevent the light bulb from falling into the basket materials.

As seen in FIGS. 2A and 2B, while in operation, each of the fastening tubes 105 are positioned within apertures within the hanging fixture 203 enabling the basket 101 to be firmly supported. The electrical conduit 205 is positioned such that it extends through an aperture in the hanging fixture 203 through a central aperture in the shroud 201. A fastener 217 works to hold the support assembly 200 along with an electrical cord 219 in a compact manner like that shown in FIG. 2B. In one embodiment of the invention, one or more support tubes 105 can be used as piping or conduit to channel water from a source to the drip watering device 109.

Figure 2C:
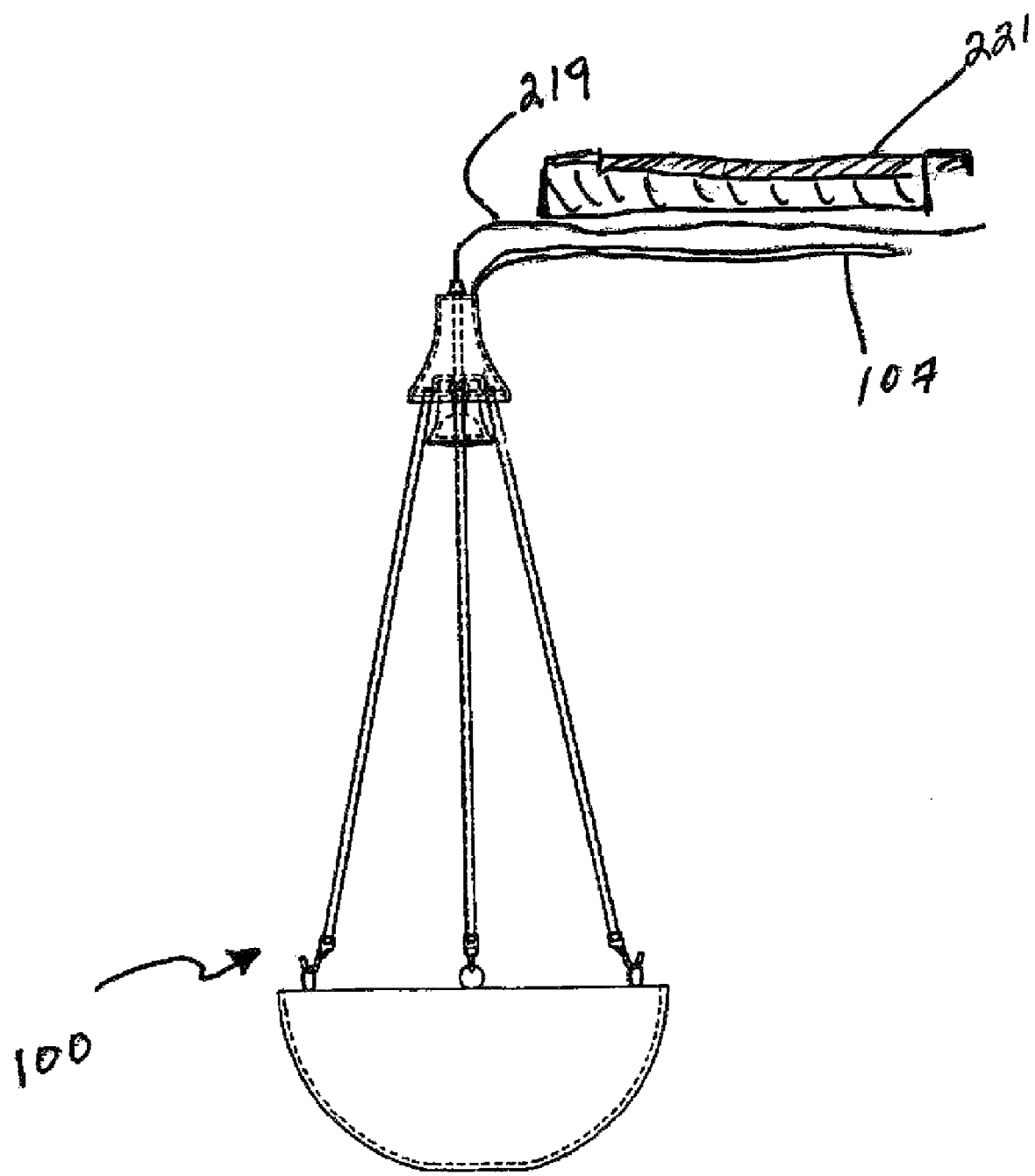
FIG. 2C is a side view of the planter showing the use of a hide-a-way mounting assembly.

FIG. 2C illustrates the planter 100 using a hide-a-way mounting assembly for the tubing 107 and electrical cord 219. The bide-a-way mounting assembly consists of one or more sections of J-channel trim siding 221. The J-channel trim siding 221 is formed into a J-shaped configuration allowing for an easy snap fit to roofing soffit or siding without the use or tools or other mechanical fasteners. While in use the tubing 107 and electrical cord 219 can be easily concealed inside the J-channel trim siding 221 allowing for a clean and neat appearance.

Figure 3:
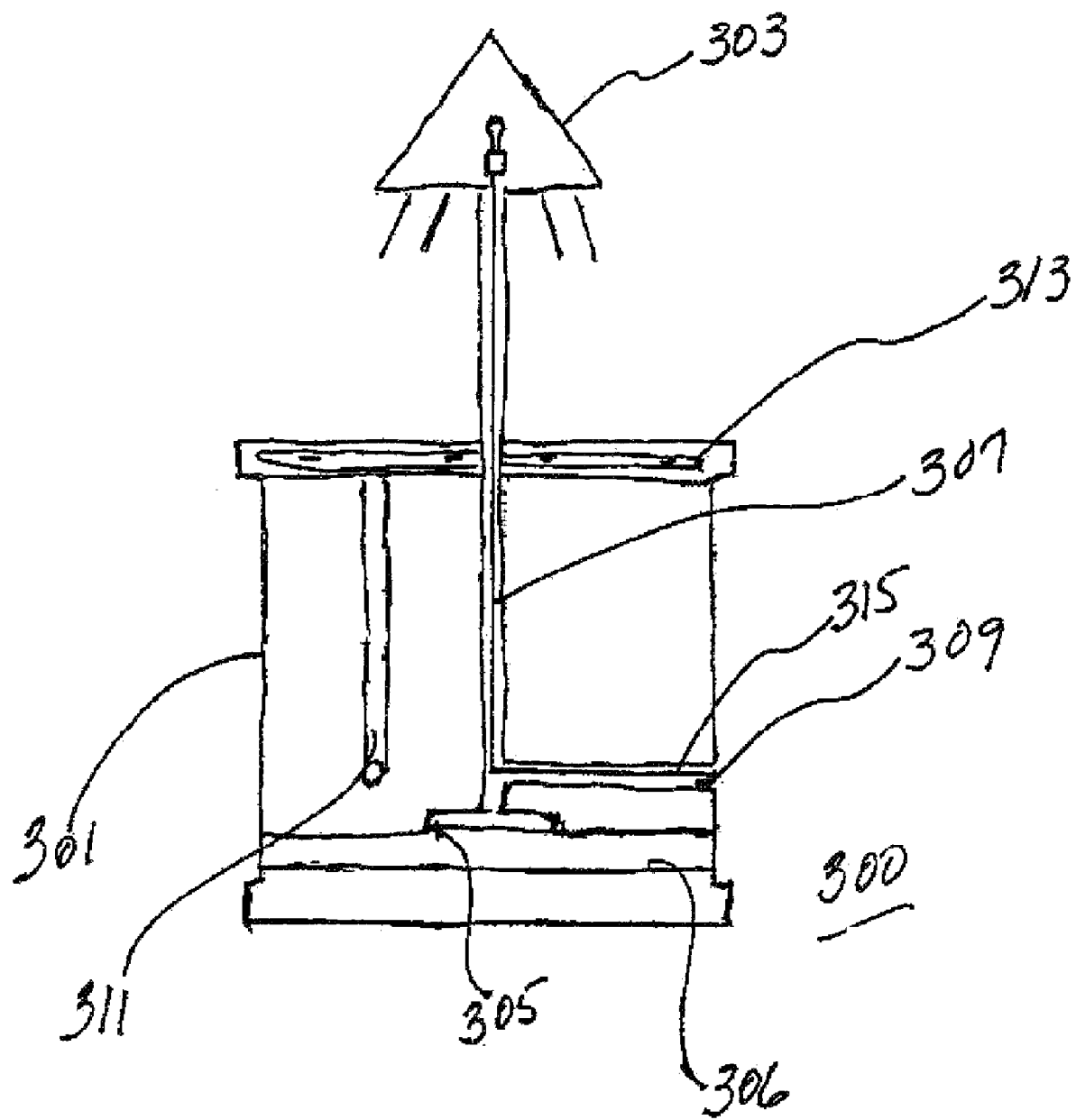
FIG. 3 is a side cross-sectional view of a box type planter in accordance with another embodiment of the invention.

FIG. 3 illustrates a side cross-sectional view of a planter box 300 in accordance with another embodiment of the invention. The planter box 300 includes a box housing 301 with floor 302 used to contain soil or other planting materials. A lamp 303 is positioned within the housing 301 so the housing base 305 contacts the floor 306 of the housing 301. A lamp support 307 includes a guide channel 309 for routing a power cable 315 for low- and/or high-voltage lighting. Although any type of lighting may be used, low-voltage lighting is preferred as safety is always a concern when using electricity near water.

A water supply line 311 is used with flexible tubing for directing the water to drip watering tubing 313 located on the surface of the housing 301. An example of drip watering tubing that allows the rate at which water is supplied to plants in planter box 300 to be controlled is that manufactured by Netafim USA, Inc.

Figure 4:
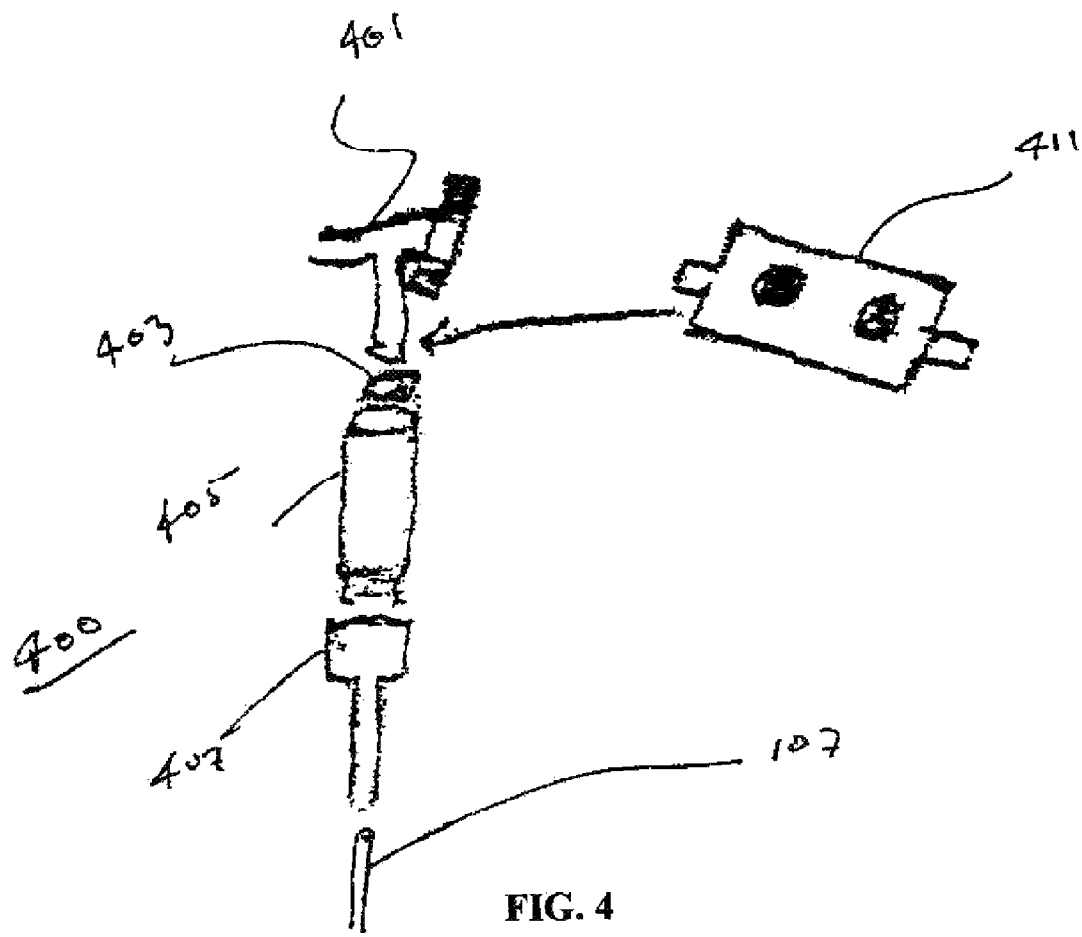
FIG. 4 is an exploded side perspective view of the attachment to a standard outdoor faucet.

FIG. 4 illustrates the attachments for the water line tubing 107 or the water supply line 311 to a standard outdoor faucet assembly 400. The standard outdoor faucet assembly 400 includes a faucet 401 which utilizes a filter washer 403 and hose pressure regulator 405 for controlling water pressure. A hose reducer 407 is used with the water line tubing 107 and water supply line 311 to supply water to both garden planter systems shown in FIG. 1 and FIG. 3. In operation, the hose pressure regulator 405 works to reduce the amount of pressure supply to the water line tubing 107 or the supply line 311 for allowing the pressure and flow rate to be reduced to acceptable levels. Optionally, a water faucet timer 411 may be used between the faucet 401 and regulator 405 for controlling the time when water will be supplied to the drip tubing 107/311.

Figure 5:
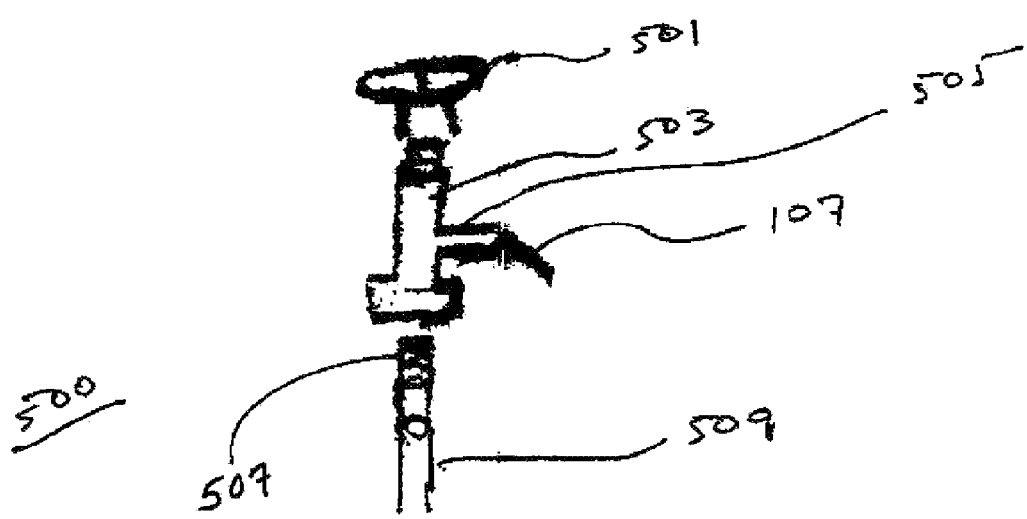
FIG. 5 is an exploded side perspective view of the attachment to a sprinkler irrigation system.

FIG. 5 illustrates the irrigation system riser assembly 500 for connecting the drip tubing 105 or the water supply line 311 to a preexisting irrigation or sprinkler system. The riser assembly 500 operates using a standard sprinkler head 501 that attaches to a riser attachment 503. The riser attachment 503 includes tap 505 for connecting the water line tubing 107 or supply line 311. A threaded end 507 is used between the sprinkler line 509 and the riser 503 for connecting water to the sprinkler line. 509. The irrigation system riser assembly 500 enables the garden planter 100 or the planter box 300 to be continually irrigated using a standard sprinkler system with replacement of only riser attachment 503.

Figure 6:
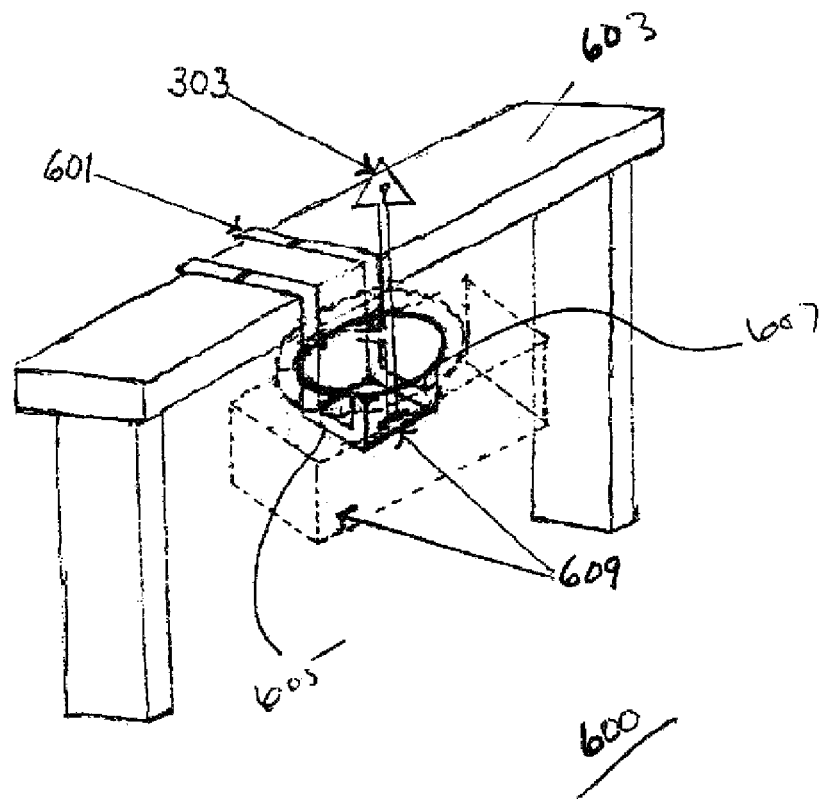
FIG. 6 is a side perspective view of a hanging double-L bracket assembly as used with the present invention.

FIG. 6 illustrates an adjustable hanging double L-bracket assembly 600 that can be used with round square or rectangular plant holders. The double L-bracket 600 includes a plurality of hanging members 601 that are typically attached to a cross beam 603 or other rigid structure. The hanging members 601 extend over the cross beam 603 where they are bent downwardly forming a lower L-bracket 605. The channel 607 formed by the lower L-bracket 605 can then be used to hold a plant holder 609 having any shape that can be held within channel 607. Finally, a light fixture 303 extends vertically from the floor of the planter in order to provide illumination.

Figure 7:
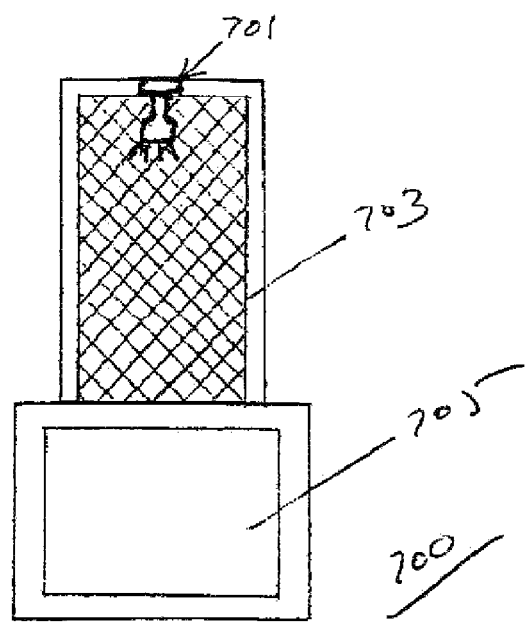
FIG. 7 is a front perspective view of a light fixedly mounted above the box type planter as shown in FIG. 3.

FIG. 7 illustrates a front perspective view of the light assembly 700 as used in an alternative embodiment to that shown in FIG. 3. The light assembly 700 includes a light 701 that is suspended atop a lattice structure 703 that extends upwardly from the planter box 705. FIG. 7 demonstrates that the light 701 does not have to be raised vertically using a lamp support 307.

Figure 8:
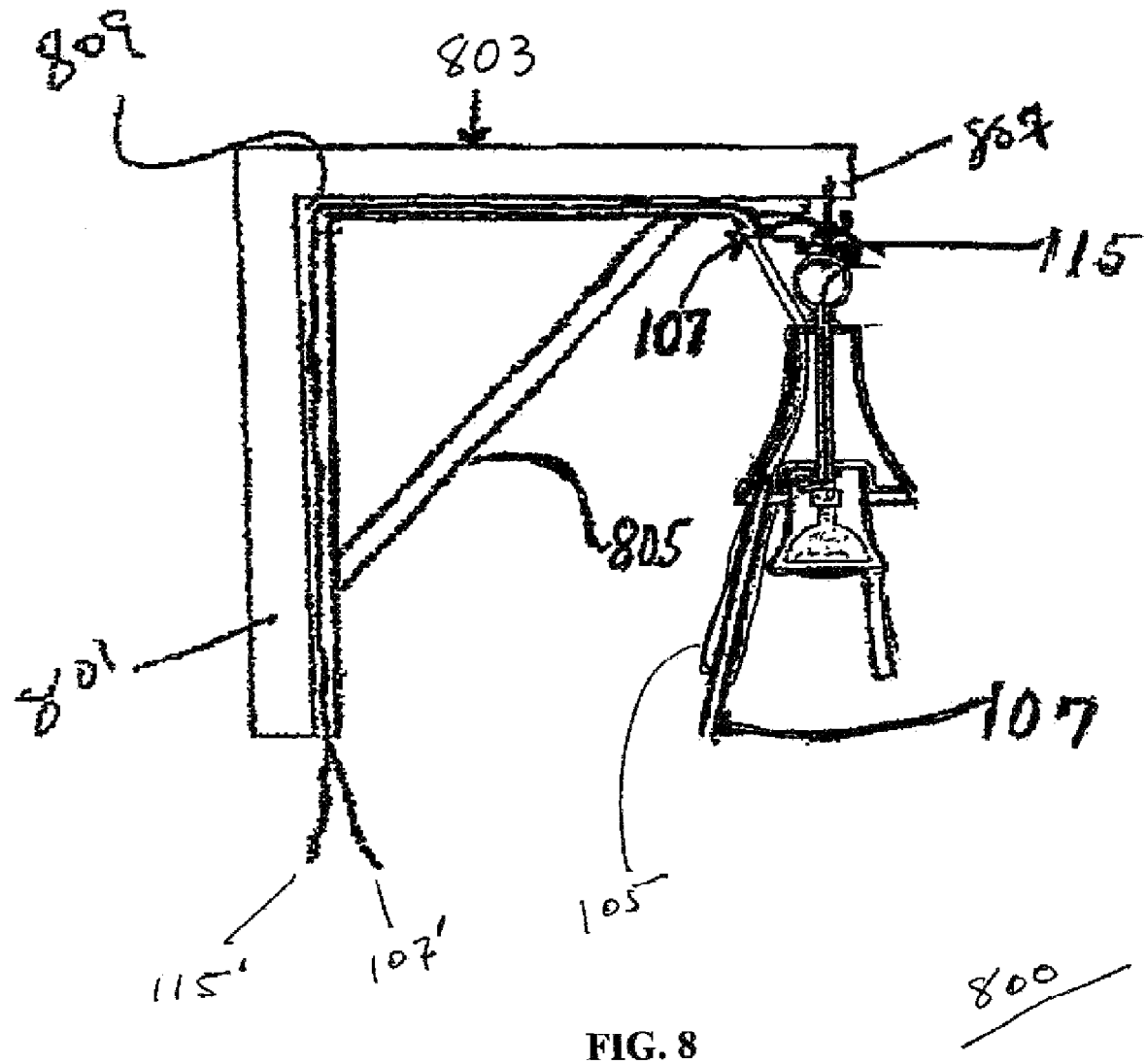
FIG. 8 is a side perspective view of an L-shaped bracket for use with the hanger as shown in FIG. 2C.

FIG. 8 illustrates a side perspective view of an L-shaped bracket assembly 800 for use with the hanger as shown in FIG. 2. The L-shaped bracket assembly 800 includes a vertical member 801, horizontal member 803 and cross member 805. In operation, the basket hangs from the end 807 of the horizontal member 803 using fastening tube 105 as described herein. In order to further hide or disguise the water line tubing 107 and power cord 115, they can be positioned through a guide channel 809 so that they are hidden from view. As described herein, the guide channel 809 can be made using J-channel siding or the like. The water line tubing 107 and power cord 115 can be positioned through the channel along the horizontal member 803 and vertical member 801 where they exit and are connected to the respective water supply or power source. Those skilled in the art will further recognize that the L-shaped bracket assembly 800 works to further hide the water line tubing 107' and power cord 115' from sight, allowing the garden planter system to present a more pleasing appearance.

Thus, the invention describes a garden planter system with integrated irrigation and lighting systems including a basket for containing plants. Irrigation tubing and an electric power cord are threaded through a hanger for supplying water for irrigating and electric power for illuminating the basket. A light is positioned above the basket for providing illumination. The invention may be assembled in a kit form and offers a convenient and inexpensive solution for watering and illuminating hanging planter baskets, box planters or the like.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A garden planter system having integrated irrigation and lighting comprising:
   a container for holding plant material;
   a support fixture for hanging the container at a predetermined location;
   a shroud attached to the support fixture;
   a plurality of tubular members attached to the shroud for forming a support structure for supporting the container;
   at least one irrigation tube for supplying water to the interior of the container;
   at least one light positioned below the shroud for providing illumination such that power is supplied to the at least one light through the support fixture; and
   wherein a portion of the at least one irrigation tube is routed through the shroud and the interior of at least one of the tubular members for substantially hiding the at least one irrigation tube from view.

2. A garden planter system as in claim 1, wherein the plurality of tubular members connect to the container using detachable fasteners.

3. A garden planter system as in claim 1, further comprising an L-shaped wall bracket for supporting the tubular members.

4. A garden planter having an integrated irrigation and lighting system comprising:
   a planter container for holding plants;
   a fastening loop for hanging the planter into a predetermined position;
   a plurality of support tubes forming a support assembly for holding the planter container;
   at least one supply line positioned within at least one of the plurality of support tubes for irrigating water to the interior of the planter container;
   at least one light within the support assembly for providing illumination into the planter container;
   the support assembly further comprising
   a shroud positioned below the fastening loop and attached to the plurality of support tubes; and wherein electrical power to the at least one light and the at least one supply line are routed, under the shroud for providing concealment.

5. A garden planter having an integrated irrigation and lighting system as in claim 4, wherein each of the plurality of support tubes includes a flared end for engaging with an aperture within the shroud.

6. A garden planter having an integrated irrigation and lighting system as in claim 4, wherein the support assembly further comprising a lens for controlling the intensity of the at least one light.

7. A garden planter having an integrated irrigation and lighting system as in claim 4, wherein the plurality of support tubes support the planter container in a tripod configuration.

8. A garden planter having an integrated irrigation and lighting system as in claim 4, wherein water is supplied to the interior of the planter enclosure using drip watering tubing.

9. A garden planter having an integrated irrigation and lighting system as in claim 4, wherein the support fixture is attached to an L-shaped bracket for supporting the garden planter against a wall.

10. A method for providing a garden planter having both an integrated irrigation and lighting system comprising the steps of:
    providing a fastener;
    providing a container for holding plant material;
    supporting the container from the fastener using a shroud and a plurality of tubular members forming a support assembly;
    supplying water to the interior of the container using at least one irrigation tube;
    positioning at least one light above the container for providing illumination;
    supplying electric power to the at least one light through under the shroud; and
    routing the at least one irrigation tube through the shroud and one of the plurality of tubular members for concealing the at least one irrigation tube.

11. A method for providing a garden planter as in claim 10, further comprising the step of:
    providing power to the at least one light using a lamp socket.

12. A method for providing a garden planter as in claim 11, further comprising the step of:
    flaring an end of each of the plurality of tubular members for engaging within an aperture within the shroud.

13. A method for providing a garden planter as in claim 10, further comprising the step of:
    forming the plurality of tubular members into a tripod configuration at the support assembly.

14. A garden planter as in claim 10, further comprising the step of: connecting the plurality of tubular members to the container using detachable fasteners.

* * * * *

UNITED STATES PATENT AND TRADEMARK OFFICE
CERTIFICATE OF CORRECTION

PATENT NO. : 7,654,038 B2
APPLICATION NO. : 11/550833
DATED : February 2, 2010
INVENTOR(S) : Gary D. Simmons It is certified that error appears in the above-identified patent and that said Letters Patent is hereby corrected as shown below:

Col. 3, line 52, "bide-a-way" should be --hide-a-way--.
Col. 6, claim 4, line 6, "comprising" should be --comprising:--.
Col. 6, claim 4, line 8, "tubes; and wherein" should be --tubes; and ¶ wherein--.
Col. 6, claim 14, line 60, "step of: connecting" should be --step of: ¶ connecting--.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO.       : 7,654,038 B2                                        Page 1 of 1
APPLICATION NO.  : 11/550833
DATED            : February 2, 2010
INVENTOR(S)      : Gary D. Simmons It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Twenty-third Day of November, 2010

David J. Kappos
*Director of the United States Patent and Trademark Office*